United States Patent
Tucker et al.

(10) Patent No.: US 9,545,587 B2
(45) Date of Patent: Jan. 17, 2017

(54) SPIN-ON FILTER WITH EXTERNAL THREADS AND METHODS

(75) Inventors: Brian Tucker, Farmington, MN (US); Bradley S. Honermann, Prior Lake, MN (US); Gary H. Gift, Richfield, MN (US); Brent A. Gulsvig, Faribault, MN (US); Kent Mehlhop, Arlington, MN (US); John R. Hacker, Minneapolis, MN (US); Mark S. Emery, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 1138 days.

(21) Appl. No.: 12/995,926

(22) PCT Filed: Jun. 3, 2009

(86) PCT No.: PCT/US2009/046131
§ 371 (c)(1),
(2), (4) Date: Feb. 28, 2011

(87) PCT Pub. No.: WO2009/149186
PCT Pub. Date: Dec. 10, 2009

(65) Prior Publication Data
US 2011/0139699 A1 Jun. 16, 2011

Related U.S. Application Data

(60) Provisional application No. 61/058,337, filed on Jun. 3, 2008.

(51) Int. Cl.
*B01D 27/00* (2006.01)
*B01D 29/11* (2006.01)
*B01D 35/153* (2006.01)

(52) U.S. Cl.
CPC .......... *B01D 29/111* (2013.01); *B01D 35/153* (2013.01); *B01D 2201/127* (2013.01);
(Continued)

(58) Field of Classification Search
CPC ....... B01D 35/30; B01D 35/306; B01D 27/08; B01D 29/11; B01D 29/111; B01D 2201/30; B01D 2201/301; B01D 2201/304; B01D 2201/205; B01D 2201/206; B01D 2201/34; B01D 2201/342; B01D 2201/345; B01D 2201/347; B01D 2201/36; B01D 2201/40; Y01S 210/17; Y01S 227/918; Y01S 29/077; Y01S 29/905; Y01S 55/05; B21D 51/32
(Continued)

(56) References Cited

U.S. PATENT DOCUMENTS 4,844,270 A 7/1989 Coffman
5,035,797 A * 7/1991 Janik .............................. 210/232
(Continued)

FOREIGN PATENT DOCUMENTS

DE 196 13 847 A1 10/1997
WO WO 2004/033067 A2 4/2004
(Continued)

OTHER PUBLICATIONS

European Search Report for Application No. 13170624.4 mailed Oct. 22, 2013.
(Continued)

*Primary Examiner* — Nam Nguyen
*Assistant Examiner* — Claire Norris
(74) *Attorney, Agent, or Firm* — Merchant & Gould P.C.

(57) ABSTRACT

A filter arrangement for threadably securing to a filter head includes a housing having a surrounding wall defining an
(Continued)

interior volume, an open mouth providing access to the interior volume and an end opposite of the open mouth. The surrounding wall has an exterior and an interior. A filter media construction is operably held within the interior volume. A sleeve, distinct from the housing, is secured to the exterior of the surrounding wall adjacent to the housing mouth and extending partially along the surrounding wall. The sleeve has an exterior and an interior. The exterior of the sleeve defines mounting threads constructed and arranged to removably mount with the filter head, when the filter arrangement is secured to the filter head. The interior of the sleeve is against the exterior of the surrounding wall. A first seal member is oriented against the sleeve to create a seal with a filter head, when the filter arrangement is secured to the filter head. A filter assembly includes a filter arrangement and a filter head. The filter arrangement is removably secured to the filter head by a threaded connection between the sleeve and the filter head. A system includes an engine utilizing a liquid and a filter assembly in fluid communication with the engine to filter the liquid. Methods of making filter arrangements include utilizing structures characterized above.

13 Claims, 19 Drawing Sheets

(52) U.S. Cl.
CPC .. *B01D 2201/291* (2013.01); *B01D 2201/295* (2013.01); *B01D 2201/34* (2013.01); *B01D 2201/4023* (2013.01); *Y10T 29/49879* (2015.01); *Y10T 29/49895* (2015.01)

(58) Field of Classification Search
USPC .................... 210/232, 416.4, 416.5, DIG. 17
See application file for complete search history.

(56) References Cited

U.S. PATENT DOCUMENTS

| | | | |
|---|---|---|---|
| 5,080,787 A * | 1/1992 | Brown et al. ................. | 210/232 |
| 5,118,417 A | 6/1992 | Deibel | |
| 5,685,985 A | 11/1997 | Brown et al. | |
| 5,772,881 A * | 6/1998 | Stockhowe et al. .......... | 210/440 |
| 5,906,740 A * | 5/1999 | Brown et al. ................. | 210/450 |
| 6,045,693 A | 4/2000 | Miller et al. | |
| 6,146,527 A | 11/2000 | Oelschlaegel | |
| 6,202,859 B1 * | 3/2001 | Langsdorf et al. ........... | 210/443 |
| 7,232,035 B1 | 6/2007 | Crawford et al. | |
| 7,556,155 B2 | 7/2009 | Harder et al. | |
| 7,882,961 B2 | 2/2011 | Menez et al. | |
| 2007/0095744 A1 | 5/2007 | Bagci et al. | |
| 2009/0014381 A1 * | 1/2009 | South et al. ................. | 210/418 |

FOREIGN PATENT DOCUMENTS

| | | |
|---|---|---|
| WO | WO 2006/012031 A1 | 2/2006 |
| WO | WO 2007/059238 A2 | 5/2007 |
| WO | WO 2007/070083 A1 | 6/2007 |

OTHER PUBLICATIONS

European Search Report for Application No. 12186708.9 mailed Apr. 2, 2013.

* cited by examiner

SPIN-ON FILTER WITH EXTERNAL THREADS AND METHODS

This application is being filed on 2 Dec. 2010, as a National Stage Patent Application of PCT International Patent application No. PCT/US2009/046131, filed 3 Jun. 2009 in the name of Donaldson Company, Inc., a U.S. national corporation, applicant for the designation of all countries except the US, and Brian Tucker, Bradley S. Honermann, Gary H. Gift, Brent A. Gulsvig, Kent Mehlhop, John R. Hacker, and Mark S. Emery, all citizens of the U.S., applicants for the designation of the US only, and claims priority to U.S. Provisional patent application Ser. No. 61/058,337, filed Jun. 3, 2008 and which applications are incorporated herein by reference. To the extent appropriate, a claim of priority is made to each of the above disclosed applications.

Technical Field

This disclosure concerns filter arrangements and methods. In particular, this disclosure concerns spin-on filter assemblies for filtering liquids, such as fuel, lubrication fluids, such as oil, and hydraulic fluids.

Background

Conventional spin-on filter designs use a thread plate at the interface end of the filter assembly. This thread plate has flow passages to allow flow in and out of the filter assembly. In addition, there is often an attaching feature near the center line of the filter assembly where threads on the thread plate engage threads on the filter head.

An alternate design is what is sometimes referred to as a "big mouth" filter. In such "big mouth" filters, the thread plate is replaced with a threaded ring. The attaching feature is near the outside diameter of the filter assembly. This design reduces the overall amount of material and is structurally stronger than the thread plate design. The big mouth design has the flexibility of using either internal or external threads. Internal threads are typically used on applications that accept either a spin-on or a bowl/cartridge design. The threaded ring mentioned above, uses internal threads.

Using external threads for a spin-on filter presents technical issues because the typical seaming process used with a threaded ring can not be used. Improvements are desirable.

SUMMARY

A filter arrangement for threadably securing to a filter head is provided. The filter arrangement includes a housing having a surrounding wall defining an interior volume, an open mouth providing access to the interior volume and an end opposite of the open mouth. The surrounding wall has an exterior and an interior. A filter media construction is operably held within the interior volume. A sleeve, distinct from the housing, is secured to the exterior of the surrounding wall adjacent to the housing mouth and extending partially along the surrounding wall. The sleeve has an exterior and an interior. The exterior of the sleeve defines mounting threads constructed and arranged to removably mount with the filter head, when the filter arrangement is secured to the filter head. The interior of the sleeve is against the exterior of the surrounding wall. A first seal member is oriented against the sleeve to create a seal with a filter head, when the filter arrangement is secured to the filter head.

In another aspect, a filter assembly is provided including a filter arrangement, as characterized above, and a filter head. The filter arrangement is removably secured to the filter head by a threaded connection between the sleeve and the filter head.

In another aspect, a system is provided including an engine utilizing a liquid and a filter assembly, as characterized above, in fluid communication with the engine to filter the liquid.

In another aspect, a method of making a filter arrangement includes providing a housing having a surrounding wall defining an interior volume, an open mouth providing access to the interior volume, and an opposite of the open mouth. The surrounding wall has an exterior and an interior. Next, there is a step of orienting a filter media construction within the interior volume. Next, there is a step of orienting a sleeve, distinct from the housing, around the exterior of the surrounding wall adjacent to the housing mouth and extending partially along the surrounding wall. The sleeve has an exterior and an interior. The exterior of the sleeve defines mounting threads constructed and arranged to removably mount with the filter head, when the filter arrangement is secured to the filter head. The interior of the sleeve is against the exterior of the surrounding wall. Next, there is a step of securing the sleeve to the housing. The method also includes providing a first seal member oriented against the sleeve to create a seal with the filter head, when the filter arrangement is secured to the filter head.

It is noted that not all the specific features described herein need to be incorporated in an arrangement for the arrangement to have some selected advantage according to the present disclosure.

DETAILED DESCRIPTION

In general, a filter arrangement in accordance with principles of this disclosure uses a drawn metal housing, a threaded sleeve and seals. The threaded sleeve is slid over the outer diameter of the housing and is secured, in various techniques, to the housing. There is at least one seal on the filter arrangement to prevent external leaks between the filter arrangement and the filter head. In some implementations, more than one seal member is utilized.

A. Example Constructions

Figures 12, 13:
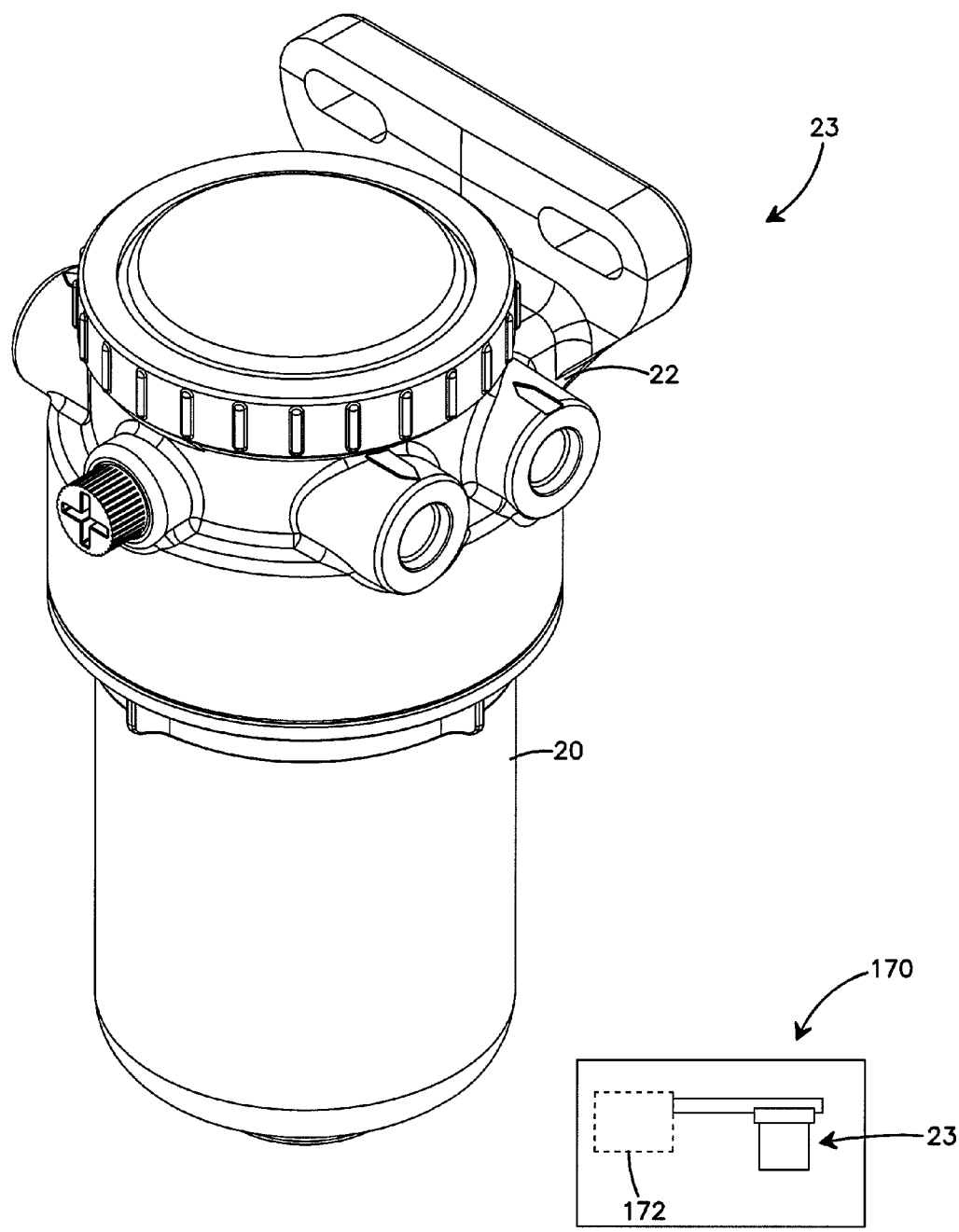
FIG. 12 is a perspective, side-elevational view of a filter assembly, including a filter head and a filter arrangement, constructed in accordance with principles of this disclosure.
FIG. 13 is a schematic view of a filter system utilizing a filter assembly constructed in accordance with principles of this disclosure.

In general, a filter arrangement is shown at reference numeral 20. The filter arrangement 20 is designed for threadably securing to a filter head 22 (FIG. 12). In general, the filter arrangement 20 is threaded onto the filter head 22 for operable use. When it is time to service the filter arrangement 20, the filter arrangement 20 is removed from the filter head 22 by unscrewing or unthreading the filter arrangement 20 from the head 22. The filter head 20 includes a housing 24. The housing 24 is typically a drawn metal housing having generally a thin-walled construction. The housing 24 includes a surrounding wall 26 defining an interior volume 28.

At one end of the housing 24 is an open mouth 30 providing access to the interior volume 28. Opposite of the open mouth 30 is an end 32. In some embodiments, such as FIGS. 1-11, the end 32 defines an opening 25 adapted to receive other structure such as a drain valve. In other embodiments, the end 32 can be a closed end and is not operably openable.

Within the interior volume 28 of the housing 24 is a filter media construction 36 (or filter cartridge 36). The filter media construction 36 may include pleated media 38 arranged in a cylindrical form to define an open filter interior 40. A first end cap 42 is secured to one end of the pleated media 38. In some arrangements, a second end cap 44 is secured to an opposite end of the pleated media 38. The filter media construction 36 may also include an inner filter support or liner 46, extending between end cap 42 and second end cap 44, and lining the open filter interior 40.

In general, liquid to be filtered, flowing in a forward-flow manner, flows from a volume 48 between the wall 26 and the pleated media 38, through the media 38, and into the open filter interior 40. From there, the filtered liquid flows out through an aperture 50 in the first end cap 42. From there the liquid is directed into the filter head 22, where it is then directed to downstream components.

In example embodiments illustrated, the filter media construction 36 further includes a filter element seal member 52 to provide a seal between the unfiltered side and the filtered side of the filter media construction 36. The filter element seal member 52 will be sealed against a corresponding portion on the filter head 22. In the various embodiments shown, the filter element seal member 52 is depicted as a seal ring 54 that is held within a radial groove 56 of an axially extending portion 58 of a first end cap 42.

In some implementations, the filter media construction 36 may further include structure to help with centering the filter media construction within the housing 24. This is described below, in connection with certain embodiments.

In general, the filter arrangement 20 includes a sleeve 60, distinct from the housing 24. By the term "distinct from the housing," it is meant that the sleeve is not made from the same piece of material as the housing 24. While the sleeve 60 can be molded onto the housing 24, it should be understood that the housing 24 exists as a separate piece before the molding process, and therefore, the sleeve 60 is distinct from the housing 24.

The sleeve 60 is secured to an exterior 62 of the surrounding wall 26 and adjacent to the mouth 30. The surrounding wall 26 also has an opposite, interior 64. The sleeve 60 extends partially along the exterior 62 of the surrounding wall 26, generally less than half of the length of the surrounding wall 26. The sleeve 60 has an exterior 66 and an opposite interior 68.

In general, the exterior 66 of the sleeve 60 defines mounting threads 70 constructed and arranged to removably mount with the filter head 22, when the filter arrangement 20 is secured to the filter head 22. The threads 70 can be any type of conventional thread utilized in these types of systems, such as Unified Screw Threads, per ANSI B1.7M-1984. The interior 68 of the sleeve 60 is generally mounted against the exterior 62 of the surrounding wall 26. The sleeve 60 is secured to the housing 24, utilizing various techniques, as described below.

In general, the filter arrangement 20 further includes a first seal member 72 oriented against the sleeve 60 to create a seal with the filter head 22, when the filter arrangement 20 is secured to the filter head 22. The first seal member 72 can be a radially directed seal member 74 held by a groove 76 in the exterior 66 of the sleeve 60 such as depicted in the embodiments of FIGS. 3, 10, 16, and 22.

The filter arrangement 20 can be connected to the filter head 22 to form a filter assembly 23, as shown in FIG. 12. In FIG. 13, a system is shown at 170. The system 170 includes an engine 172 utilizing a liquid. The liquid can be, for example, lubrication, fuel, or a hydraulic fluid. The filter assembly 23 is in fluid communication with the engine 172 to filter the liquid that utilized by the engine 172.

1. The Embodiments of FIGS. 1-11

In the embodiment of FIGS. 1-11, the housing surrounding wall 26 has a plurality of tabs 82 extending radially outwardly from the open mouth 30. In the embodiment shown, the tabs 82 are evenly spaced about the rim 84 of the mouth 30. The tabs 82 are illustrated as being curved to form a hook-shape 86, FIG. 8. The sleeve 60 has a first rim 88. When the sleeve 60 is passed over the wall 26 of the housing 24, it is moved axially along the wall 26 until the first rim 88 engages a radially extending flange 90 at the mouth 30. The sleeve 60 is rotated relative to the housing 24 until slots 92 defined by the sleeve 60 along the first rim 88 line up with the tabs 82.

The tabs 82 are then crimped in a radially direction toward the housing 24 center line to affix the housing 24 and the threaded sleeve 60 together. Crimping the tabs 82 into the slots 92 creates a mechanical lock between the housing 24 and the threaded sleeve 60, which prevents the housing 24 from turning about its center line relative to the sleeve 60 and prevents relative motion in an axial direction.

Figure 5:
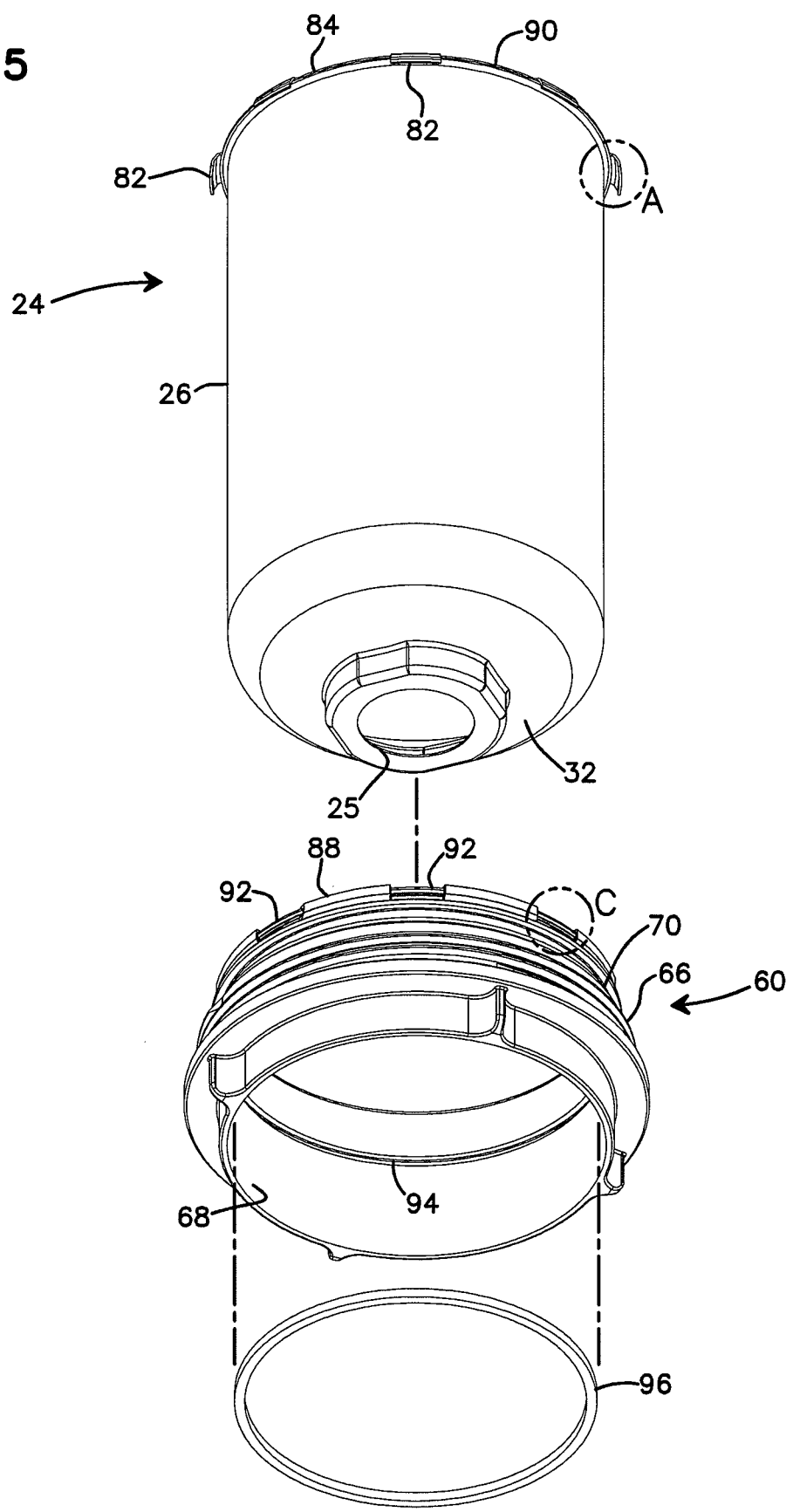
FIG. 5 is an exploded perspective view of the filter housing and sleeve of FIGS. 1-3.
Figure 6:
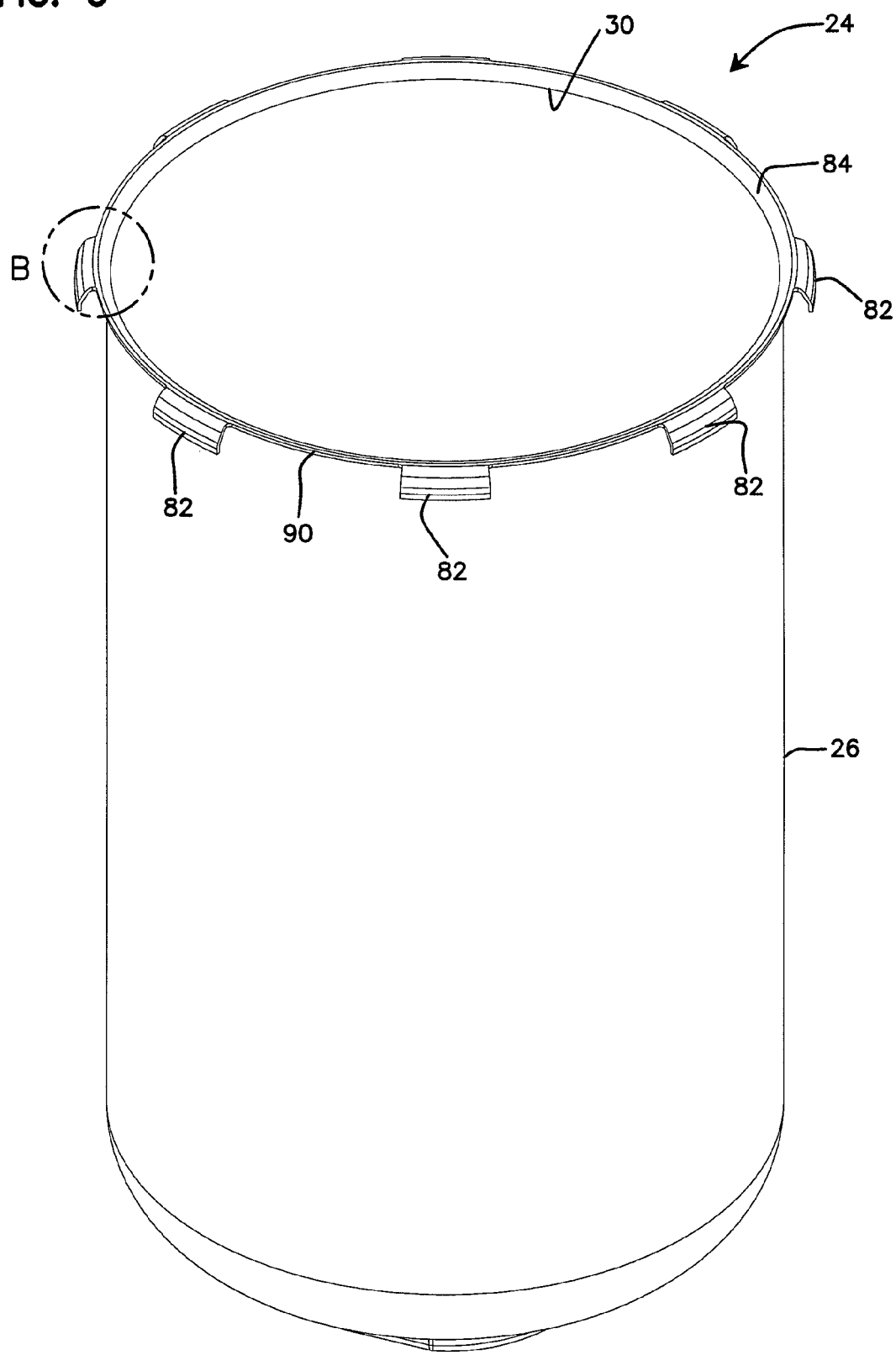
FIG. 6 is a perspective view of the filter housing of FIGS. 1-5.
Figure 7:
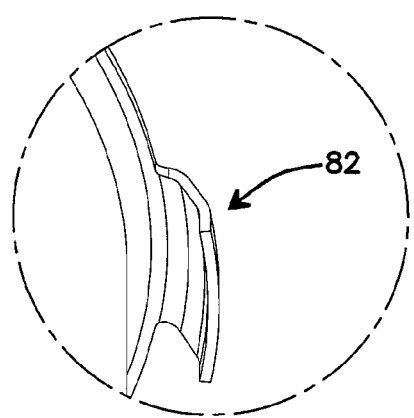
FIG. 7 is an enlarged, perspective view of a portion of detail A of FIG. 5.
Figure 8:
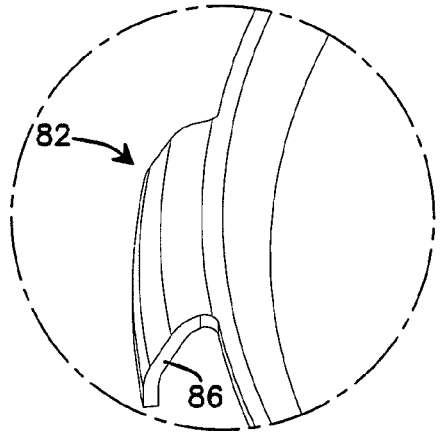
FIG. 8 is an enlarged, perspective view of detail B of FIG. 6.
Figure 9:
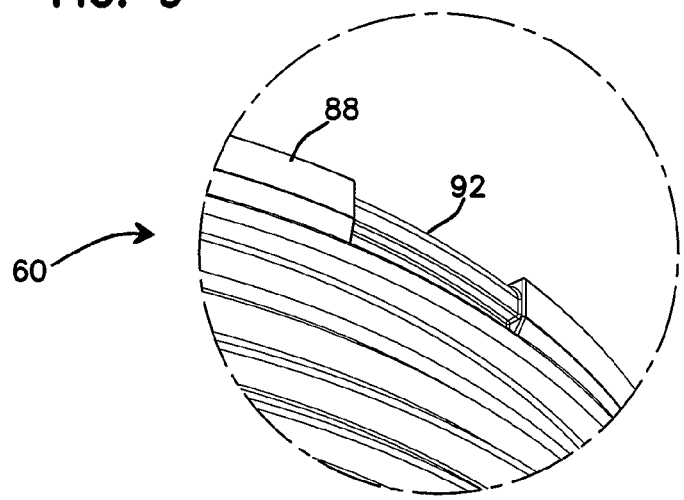
FIG. 9 is an enlarged, perspective view of detail C of FIG. 5.

In FIG. 5, it can be seen how the sleeve 60 defines a seal gland 94 along the sleeve interior 68. The seal gland 94 holds a seal member 96, which forms a radial seal 98 between and against the sleeve 60 and the exterior 62 of the surrounding wall 26.

Figure 1:
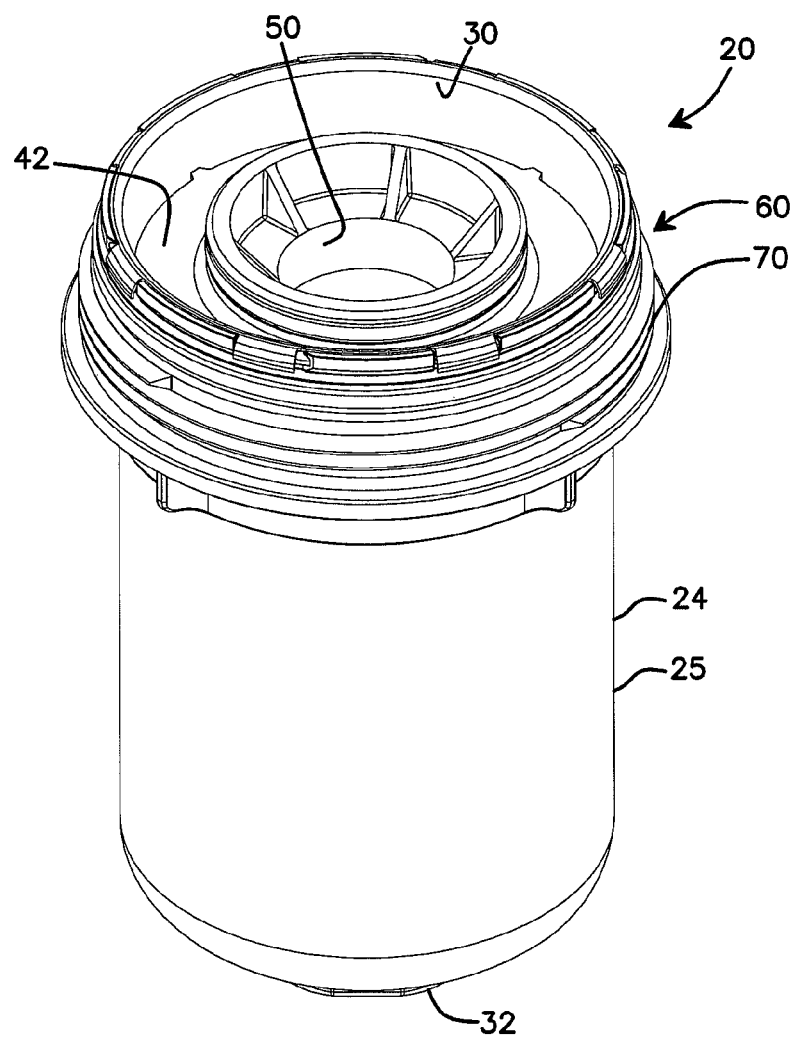
FIG. 1 is a perspective view of a first embodiment of a filter arrangement, constructed in accordance with principles of this disclosure.
Figure 2:
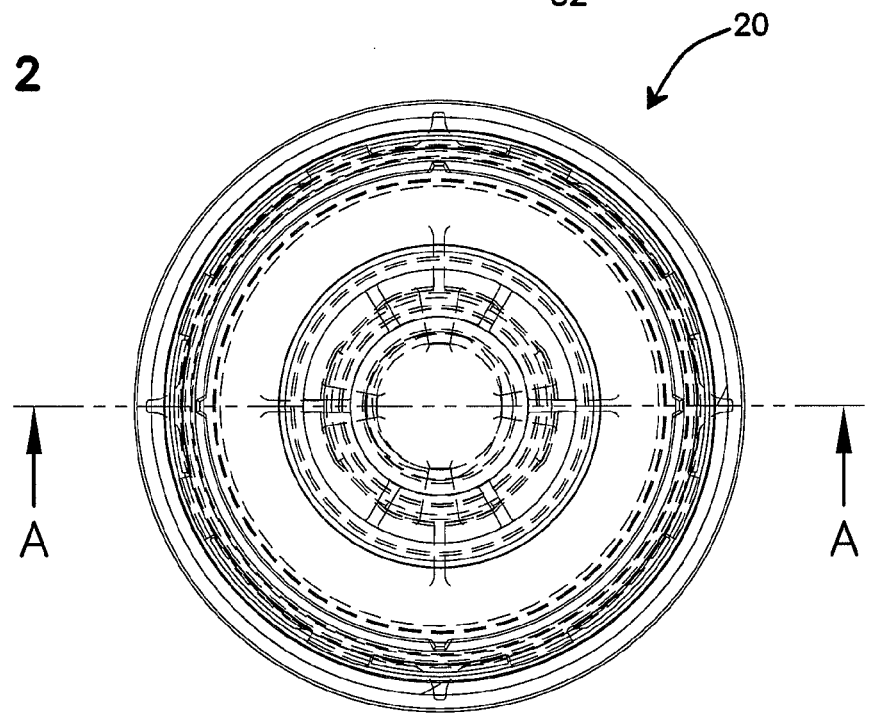
FIG. 2 is a top plan view thereof.
Figure 3:
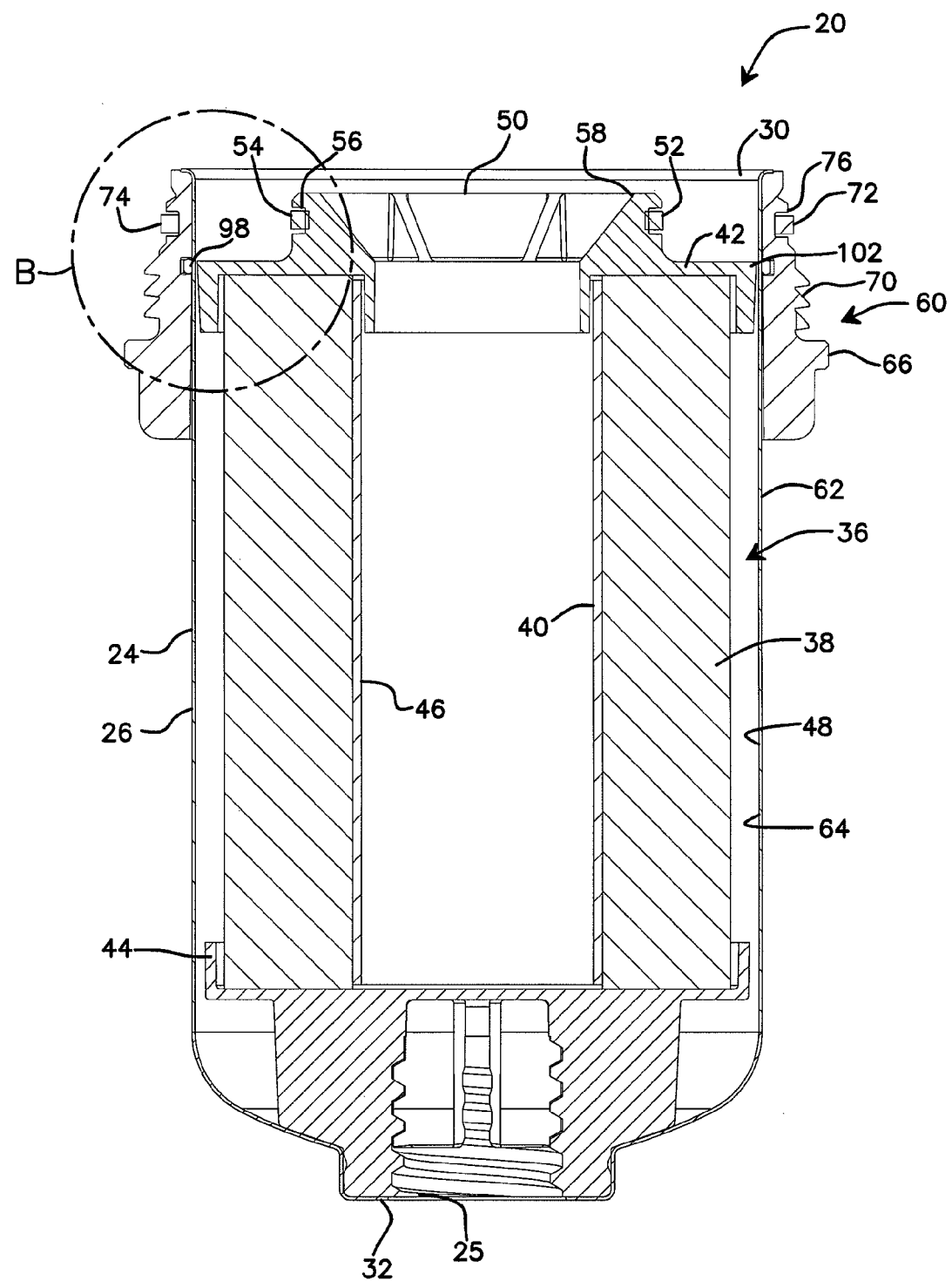
FIG. 3 is a cross-sectional view of the embodiment of FIGS. 1 and 2, the cross-section being taken along the line A-A of FIG. 2.
Figure 4:
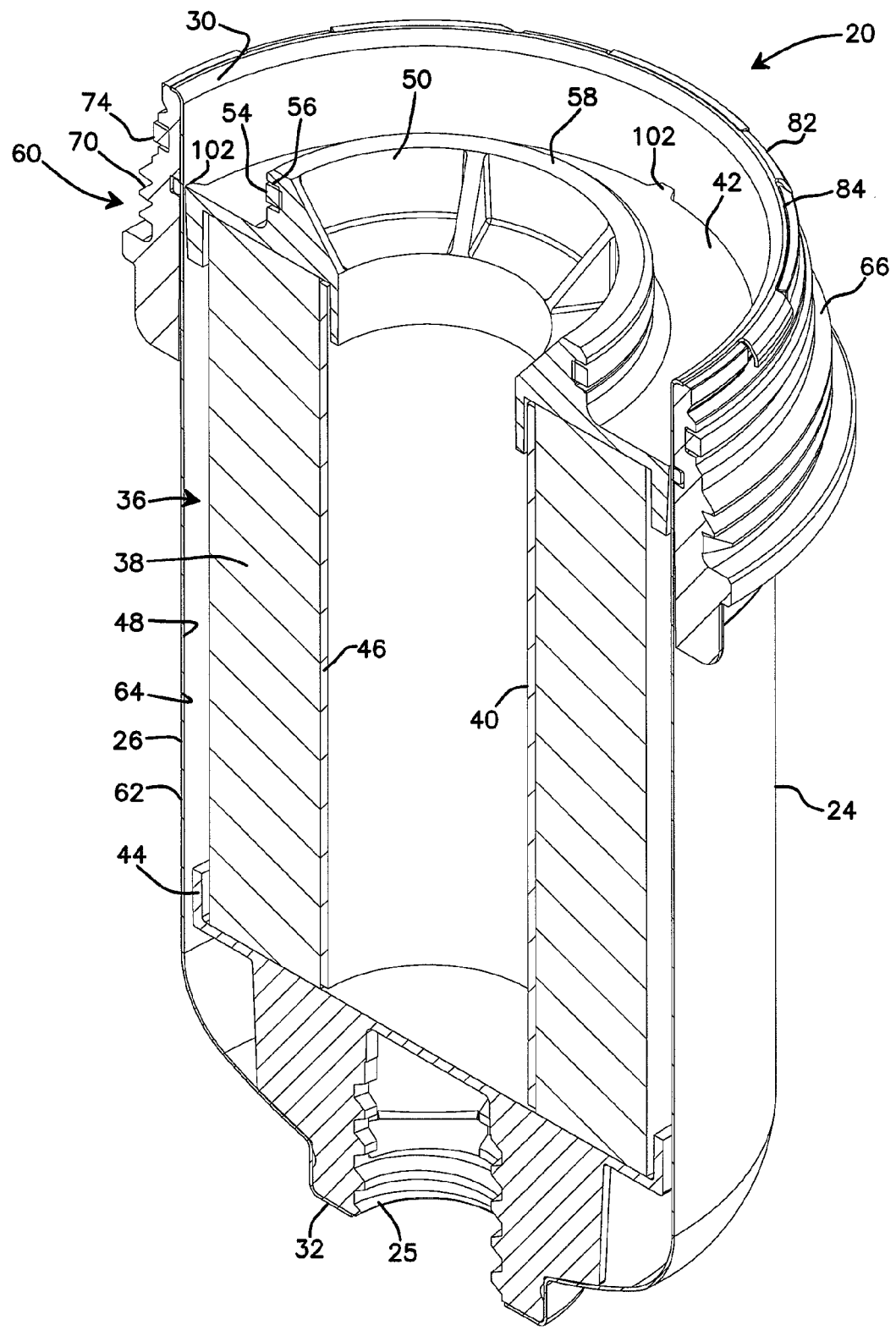
FIG. 4 is a perspective of the cross-sectional view of FIG. 3.
Figure 10:
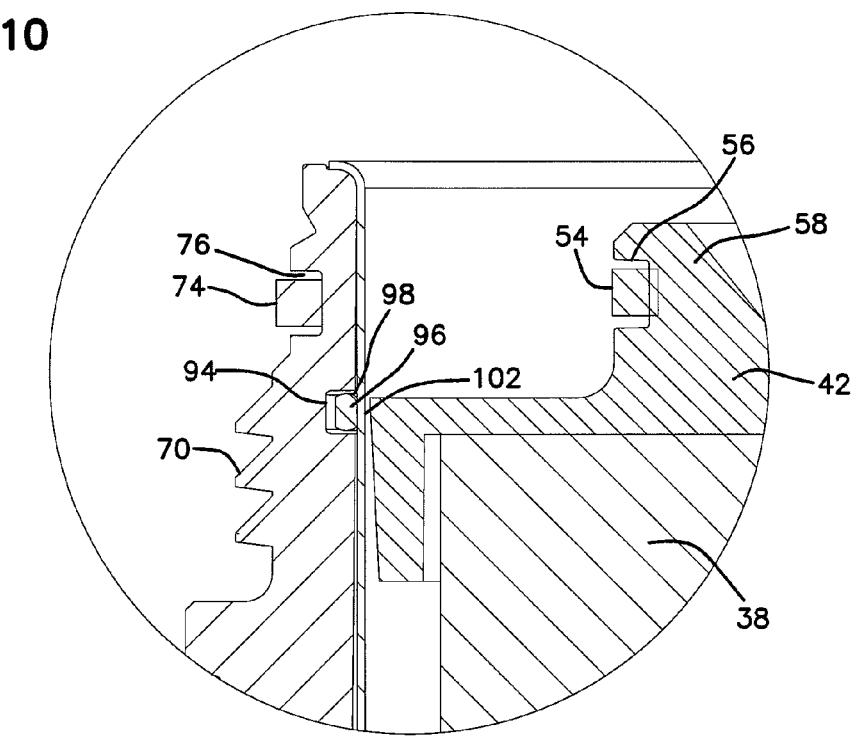
FIG. 10 is an enlarged view of detail B of FIG. 3.
Figure 11:
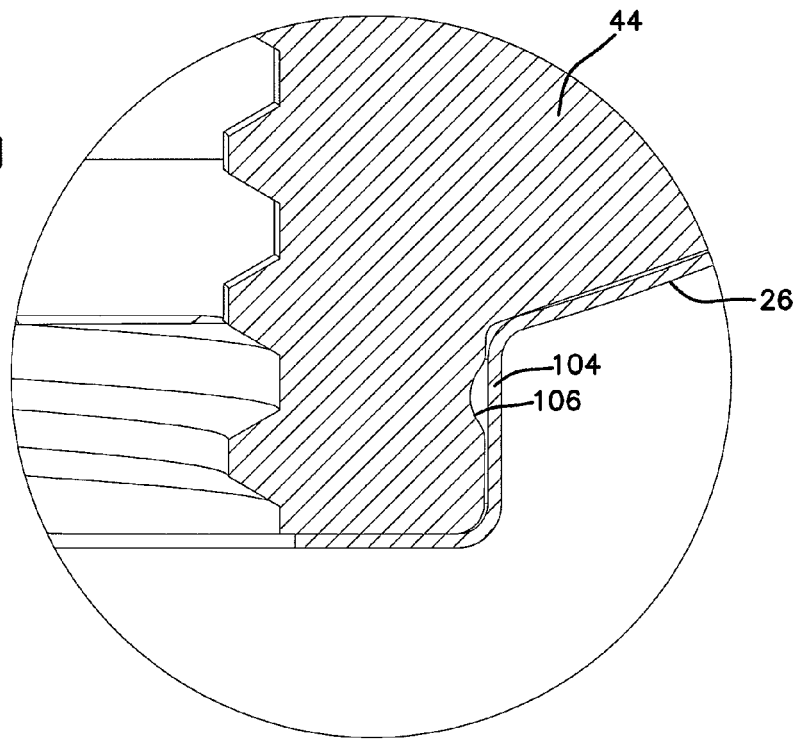
FIG. 11 is an enlarged view of detail C of FIG. 3.

In FIGS. 4 and 10, it can be seen how the filter media construction 36 is centered in the housing 24 by a series of guides 102 that are located circumferentially around the outer diameter of the first end cap 42. The guides 102 ensure that the center line of the filter media construction 36 is within acceptable tolerance of the center line of the housing 24.

In this embodiment, the filter media construction 36 is retained in the housing 24 by crimping a lower end 104 of the housing 24 into a recessed area 106 that is defined by the outer surface of the second endcap 44.

2. The Embodiments of FIGS. 14-20

Figure 14:
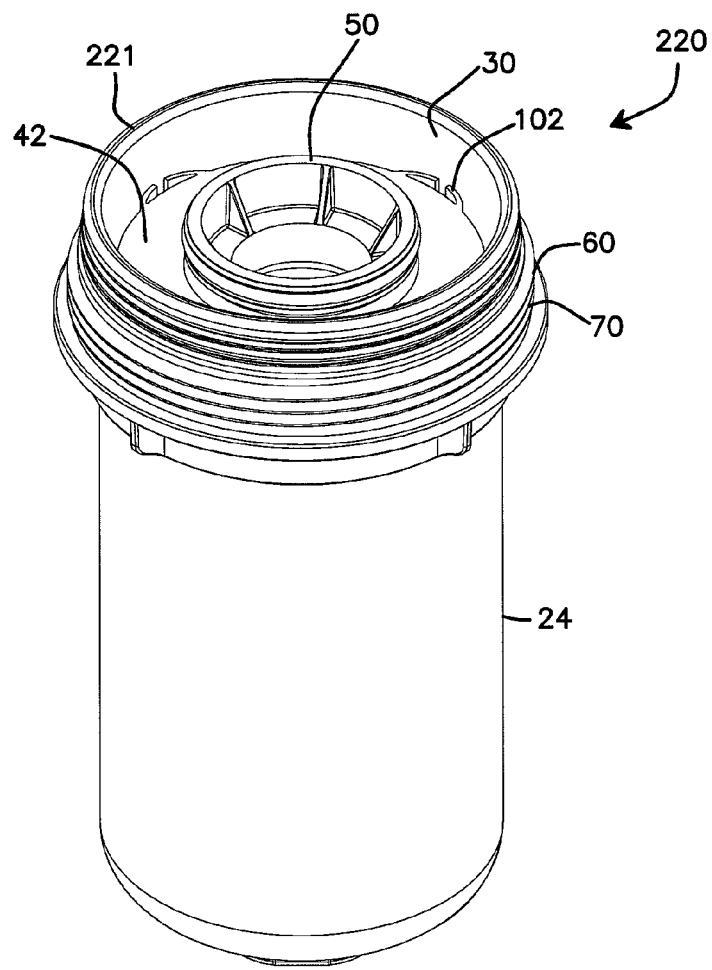
FIG. 14 is a perspective view of a second embodiment of a filter arrangement, constructed in accordance with principles of this disclosure.
Figure 15:
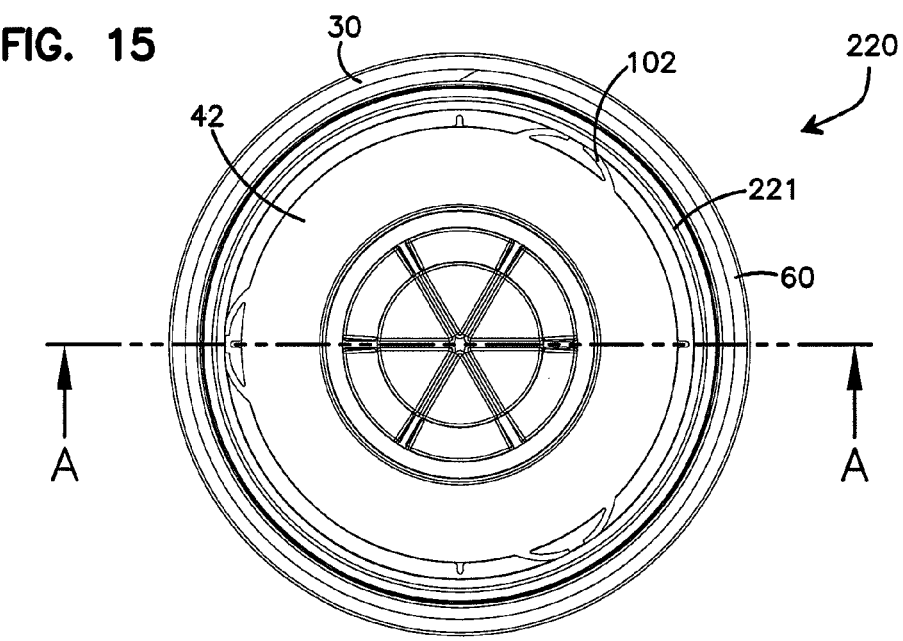
FIG. 15 is a top plan view of the embodiment of FIG. 14.
Figure 16:
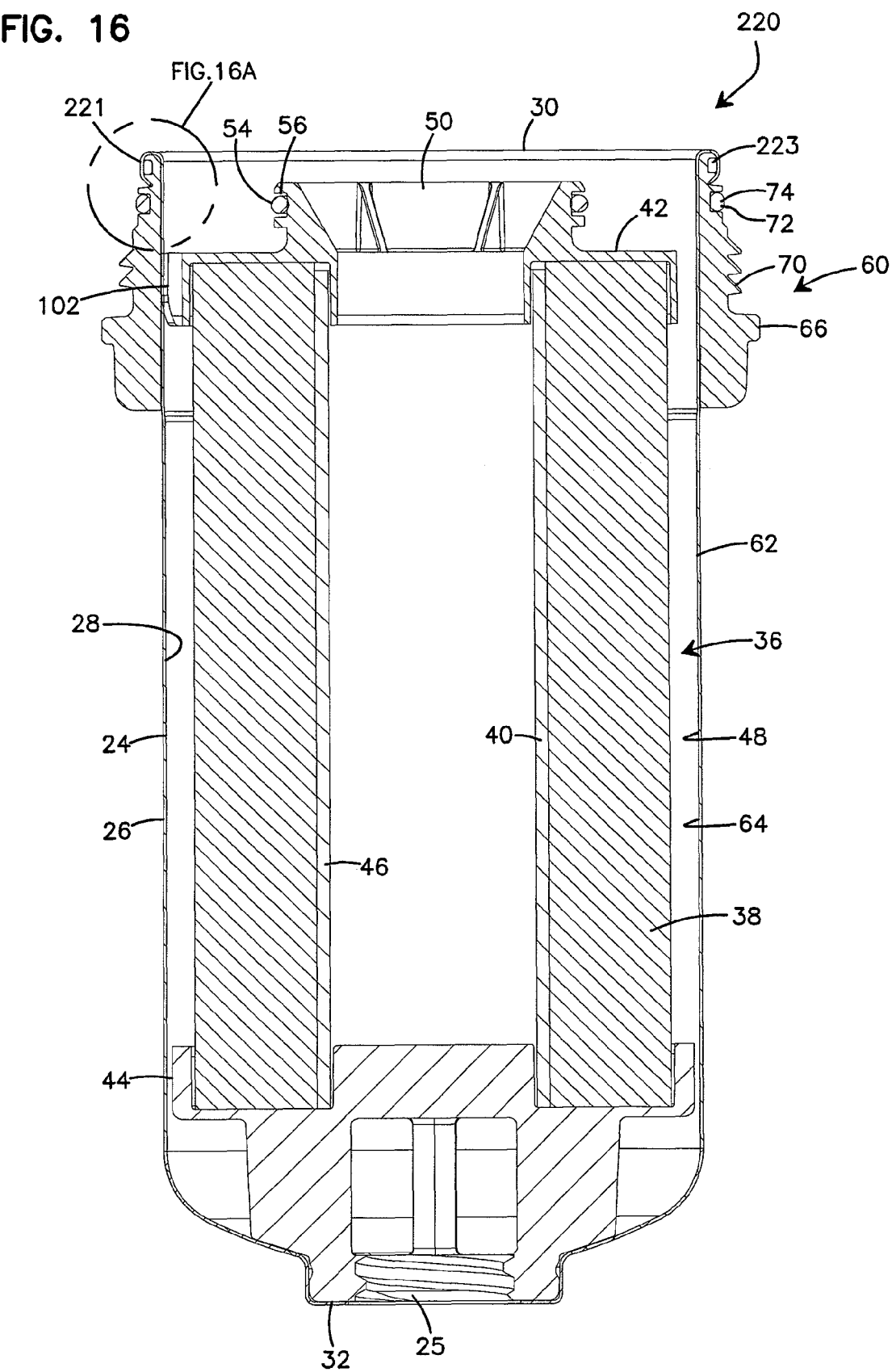
FIG. 16 is a cross-sectional view of the embodiment of FIGS. 14 and 15, the cross-section being taken along the line A-A of FIG. 15.

In the embodiment of FIGS. 14-16, many of the features and components are the same as described with respect to the embodiment of FIGS. 1-11. To this extent, the same reference numerals are used for analogous features, and their descriptions are incorporated herein by reference. The filter arrangement depicted in FIGS. 14-20 is shown at reference numeral 220. Note that in the embodiment of FIGS. 1-11, a plurality of tabs 82 fold down over the top of the threaded ring or sleeve 60. In the embodiment of FIGS. 1-11, the tabs 82 are used to both hold the sleeve 60 axially to the housing 24 and also rotationally to the housing 24, such that the sleeve 60 would not rotate about the housing 24. Also note that in the embodiment of FIGS. 1-11, there is a seal member 98 located between the interior 68 of the sleeve 60 and the exterior surface 62 of the housing 24.

In the embodiment of FIGS. 14-20, a seam 221 results from one continuous piece of material, rather than the plurality of tabs 82 shown in FIGS. 1-11. The seam 221 holds the sleeve 60 axially relative to the housing 24. To prevent rotation of the sleeve 60 relative to the housing 24, the sleeve 60 can be press fit to the outer diameter of the housing 24; alternatively, the sleeve 60 can be glued to the outer diameter of the housing 24 by using glue or adhesive between the exterior 62 of the housing 24 and interior 68 of the sleeve 60.

A seal member 223 is oriented on the outside diameter of the sleeve 60, near a top 224 (FIG. 16A) of the sleeve 60. The seal member 223 is held within a groove 225 (FIG. 16A) defined by the sleeve 60. The groove 225 faces the exterior or outside portion of the sleeve 60. The seal member 223 creates a seal 226 between the sleeve 60 and an inside curve 227 of the seam 221, which is one continuous piece of material. Typically, the seam 221 will be formed from a drawn metal, such as steel. The seal 226 prevents liquid from leaking between the housing 24 and the sleeve 60.

Figure 16A:
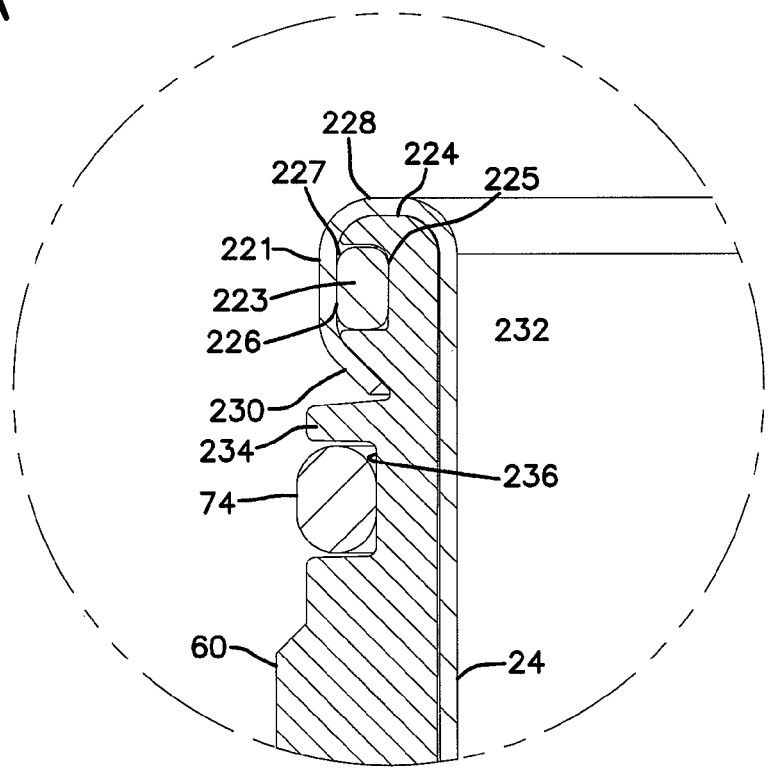
FIG. 16A is an enlarged view of the detail shown in FIG. 16.
Figure 17:
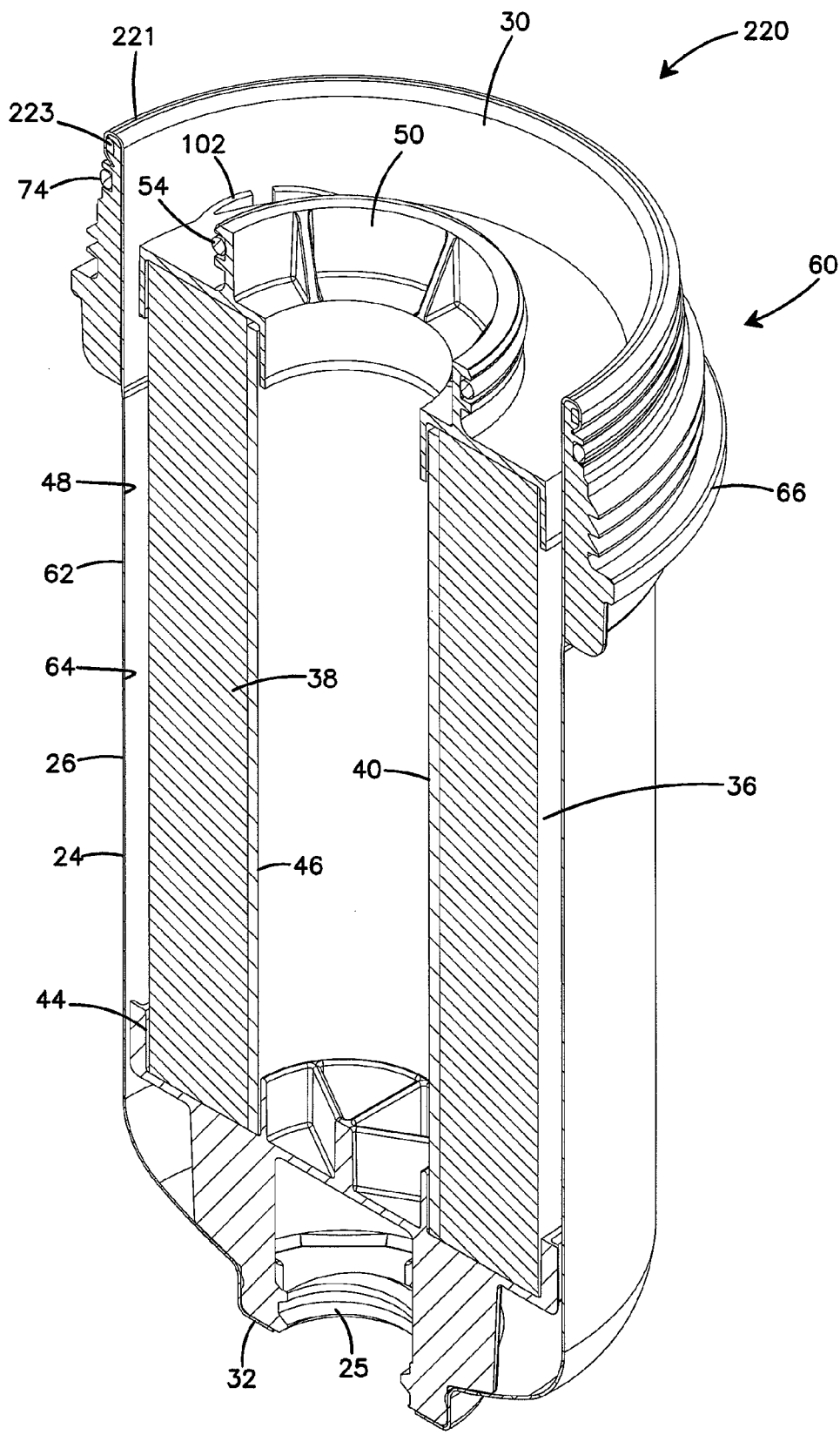
FIG. 17 is a perspective view of the cross-section of the filter arrangement shown in FIG. 16.

In FIG. 16A, it can be seen how, in this embodiment, the seam 221 is formed by bending or folding the housing 24 to form an upside down u-shaped bend 228, which also forms the open mouth 30 of the housing 24. The u-shaped bend 228 terminates with an inwardly extending leg 230. The leg 230 locks around projection 232 of sleeve 60, in order to help lock the seam 221 in place with the seal member 223 trapped and secured within the groove 225.

Adjacent to and below the projection 232 of the sleeve 60 is a flange 234 projecting radially from the sleeve 60. The flange 234 forms one side of a groove 236, which holds the seal member 74.

Figure 19A:
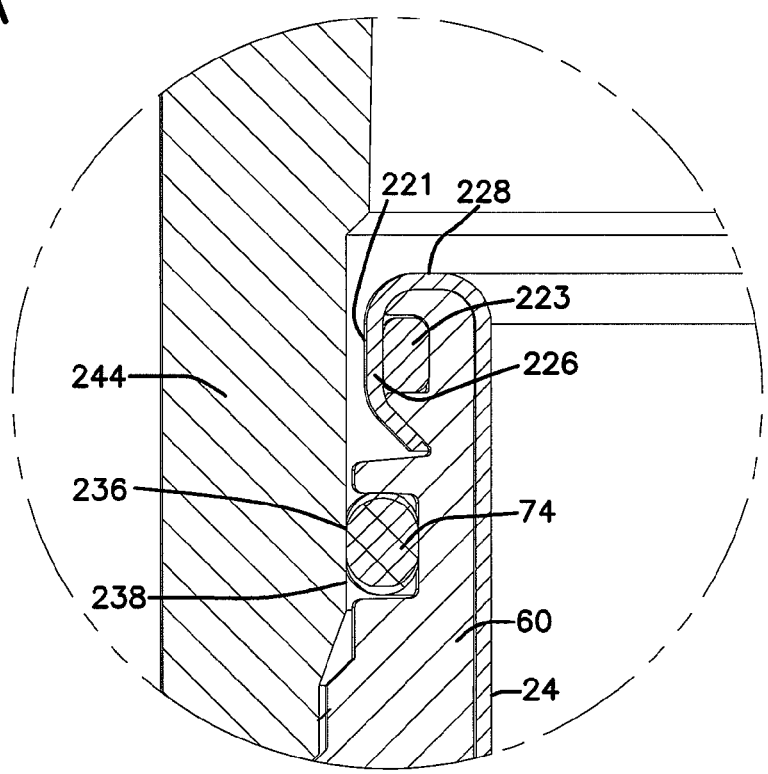
FIG. 19A is an enlarged view of the detail shown in FIG. 19.
Figure 19:
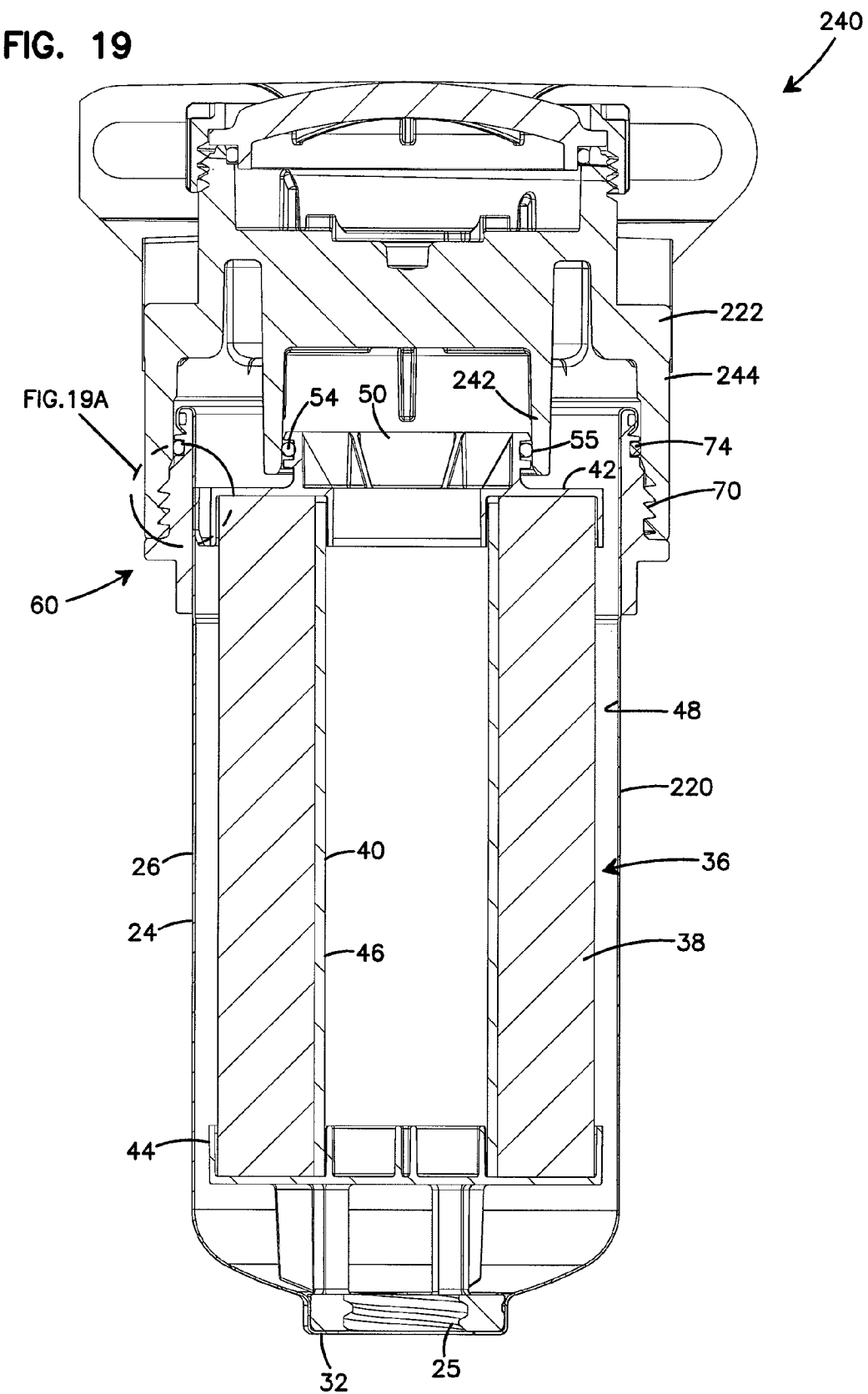
FIG. 19 is a cross-sectional view of the filter arrangement of FIG. 14 secured to a filter head, to provide a filter assembly.
Figure 20:
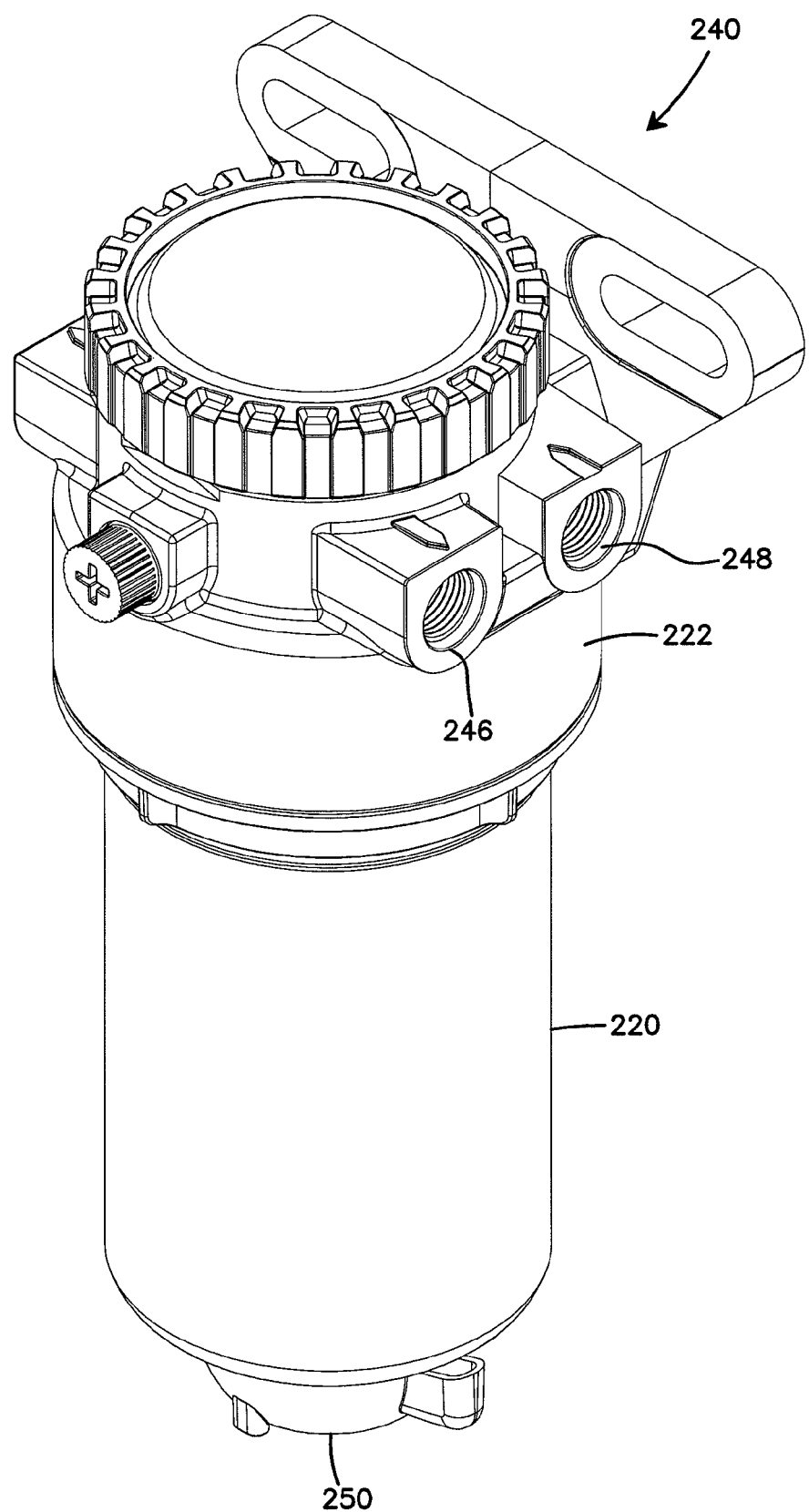
FIG. 20 is a perspective view of the filter assembly of FIG. 19.
Figure 21:
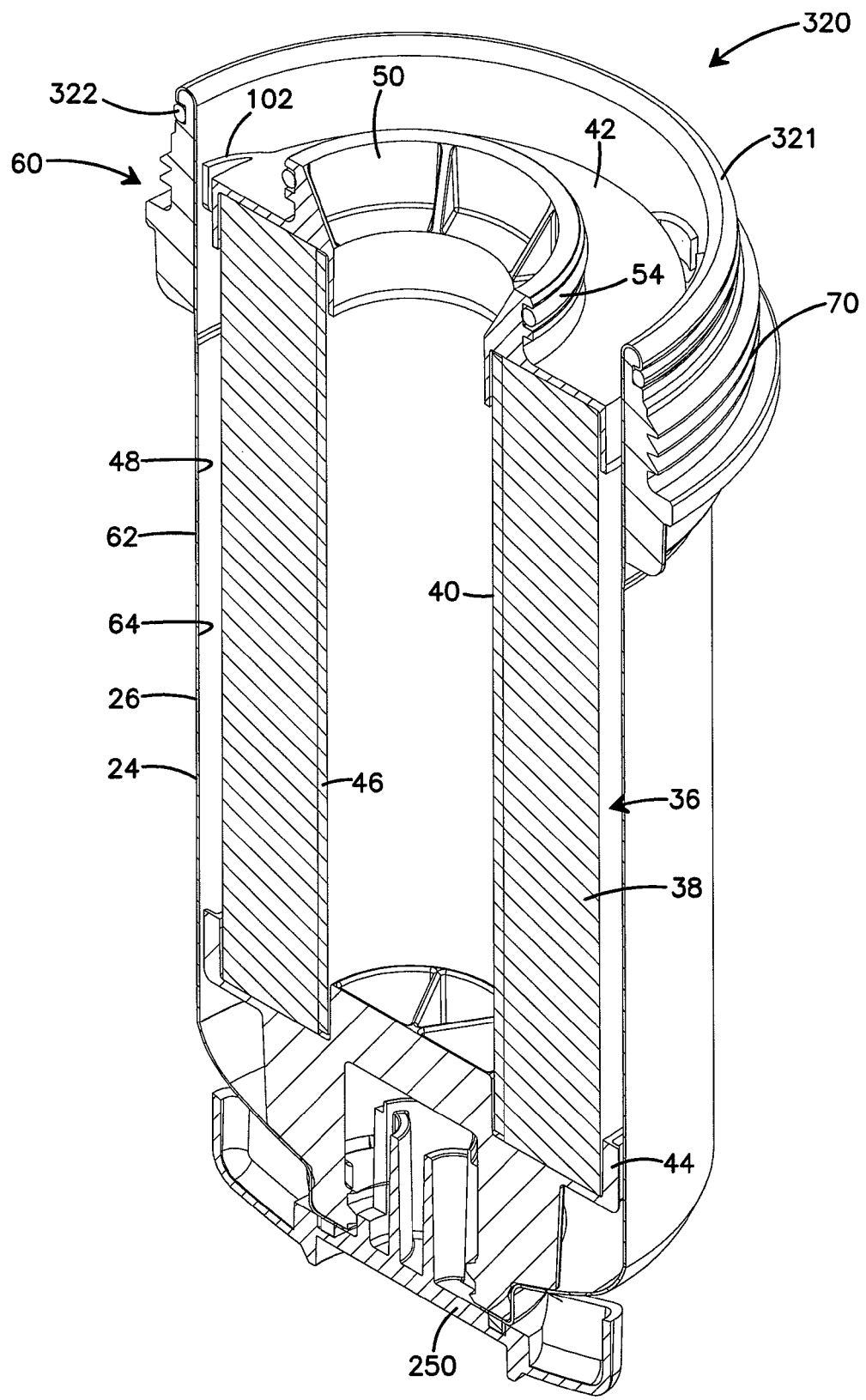
FIG. 21 is a perspective, cross-sectional view of a third embodiment of a filter arrangement, constructed in accordance with principles of this disclosure.
Figure 22:
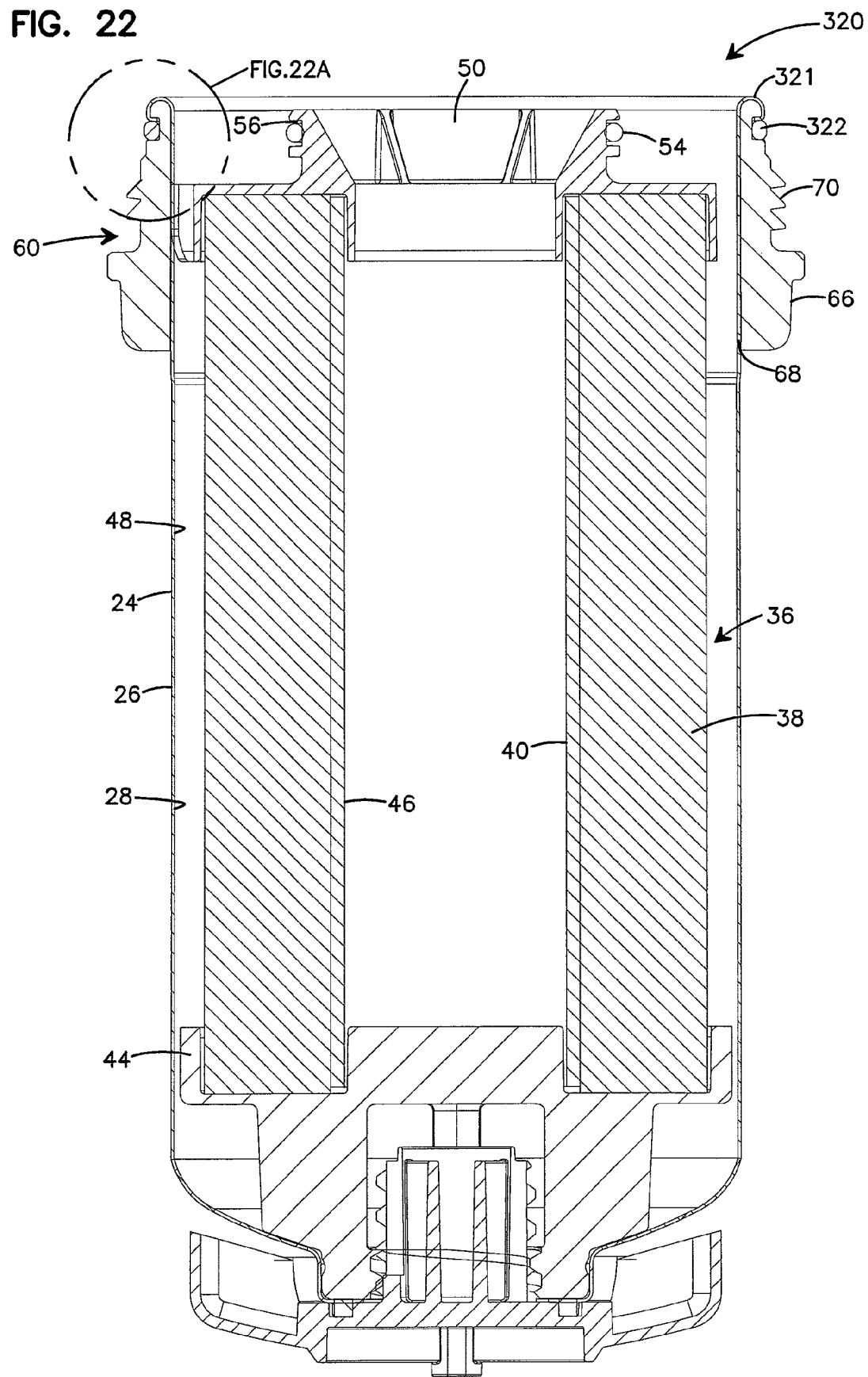
FIG. 22 is a cross-sectional view of the filter arrangement of FIG. 21.
Figure 22A:
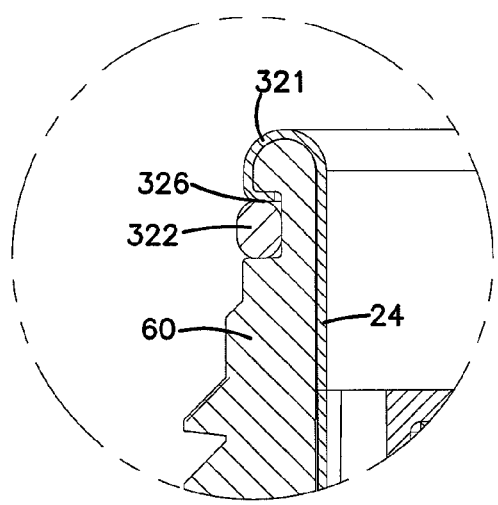
FIG. 22A is an enlarged view of the detail shown in FIG. 22.

FIGS. 19, 20, and 19A illustrate a filter assembly 240, which includes filter arrangement 220 secured to filter head 222. FIG. 19A shows how seal member 74 creates a seal 236 between the sleeve 60 and the filter head 222; specifically, between the sleeve 60 and an inside wall 238 of the filter head 222.

In FIG. 19, it can also be seen how the seal member 54 creates a seal 55 between the filter cartridge 36 and the filter head 222; specifically, between the end cap 42 and an internal wall 242 in the filter head 222. The internal wall 242 is circumscribed by an outer wall 244. The outer wall 244 defines the internal surface 238, which forms seal 236 with the seal member 74. The wall 244 also, in this embodiment, includes internal threads, which mate with threads 70 on the sleeve 60, to provide removable attachment of the filter arrangement 220 to the filter head 222.

In FIG. 20, the filter head 222 is shown having ports 246, 248. These ports 246, 248 form either inlet or outlet ports. Fluid to be filtered flows through one of the ports 246, 248, and then into the volume 48 between the wall 26 and the media 38. From there, the liquid flows through the media 38, and into the open filter interior 40. From there, the filtered liquid flows out through the aperture 50 in the first end cap 42, and then exits the assembly 240 through one of the ports 246, 248.

In FIG. 20, it can be seen how a twist-valve structure 250 can be oriented in the opening 25 to allow for selective draining of water or other types of fluid that is collected in the housing 24 after a period of use.

Figure 18:
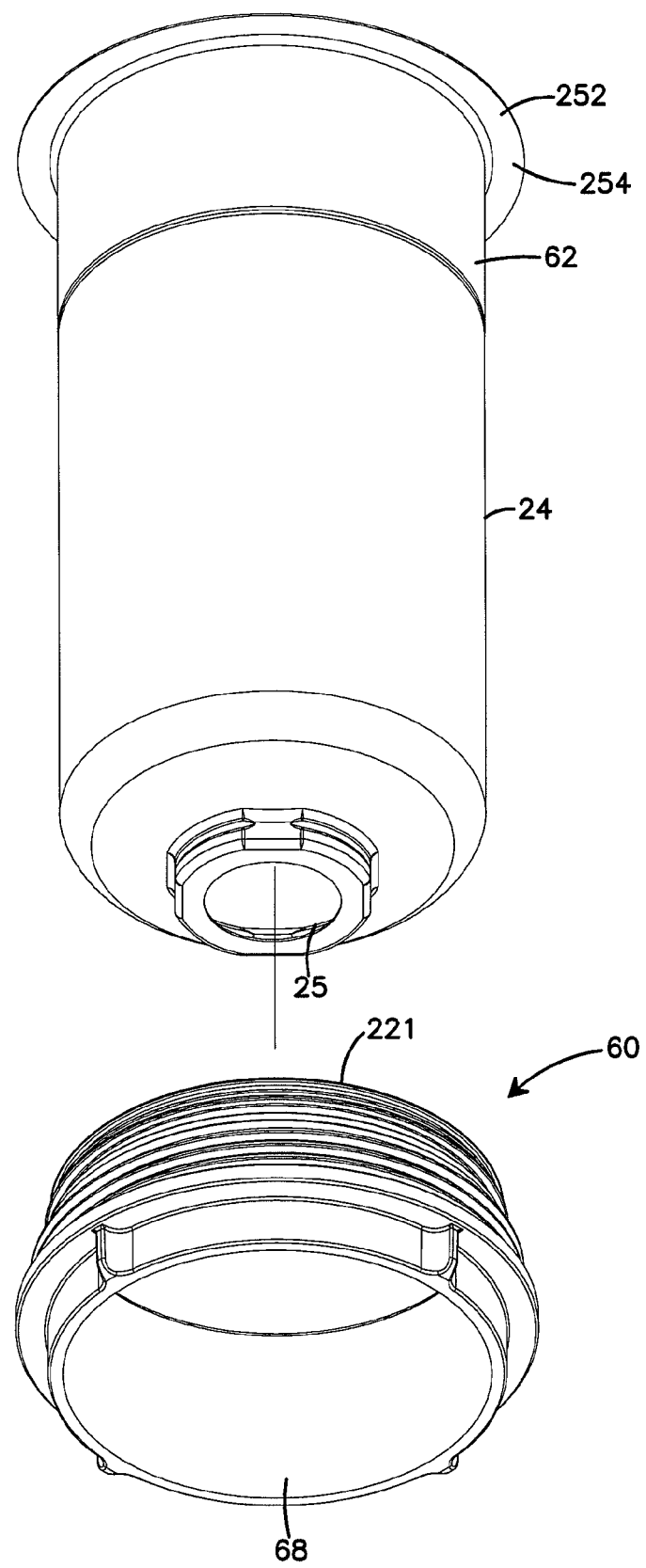
FIG. 18 is an exploded, perspective view of the filter housing and the sleeve utilized in the embodiment of FIG. 14.

FIG. 18 shows a perspective, exploded view of the housing 24 and sleeve 60, during the assembly process. In FIG. 18, it can be seen how prior to seam 221 being formed, it has the configuration of a flat flange 252. The sleeve 60 is mounted around the housing 24, such that the internal surface 68 of the sleeve 60 is against the exterior 62 of the housing 24. The sleeve 60 may be secured rotationally to the housing 24 by, for example, press fitting the sleeve 60 to the housing 24, or by adhering the sleeve 60 to the housing 24 using glue or adhesive. After the sleeve 60 has been located on the housing 24 and positioned such that the end 224 is engaged against inside axially surface 254 of the flange 252, the flange 252 is bent to form upside down u-shaped bend 228, which covers the seal member 223 and forms seal 226. This forms the seam 221. The leg 230 is bent against the projection 232 to help axially lock the sleeve 60 relative to the housing 24.

3. The Embodiment of FIGS. 21-24

Figure 23A:
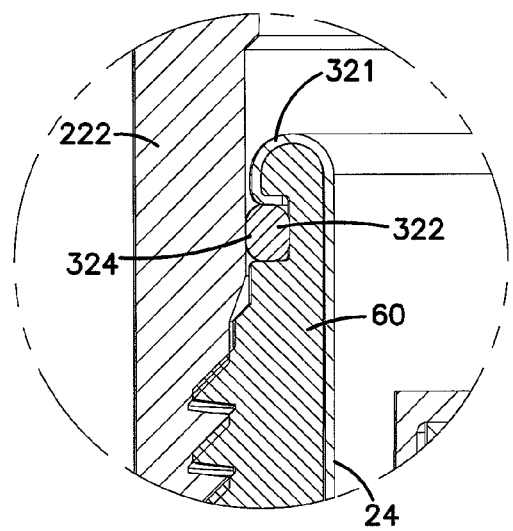
FIG. 23A is an enlarged view of the detail shown in FIG. 23.
Figure 24:
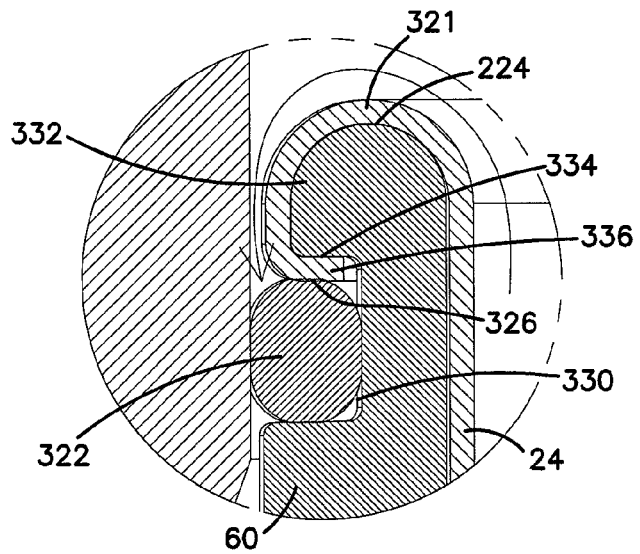
FIG. 24 is an enlarged view of FIG. 23 and showing how the seal member creates a seal to prevent liquid from leaking between the sleeve and either the housing or the filter head.
Figure 23:
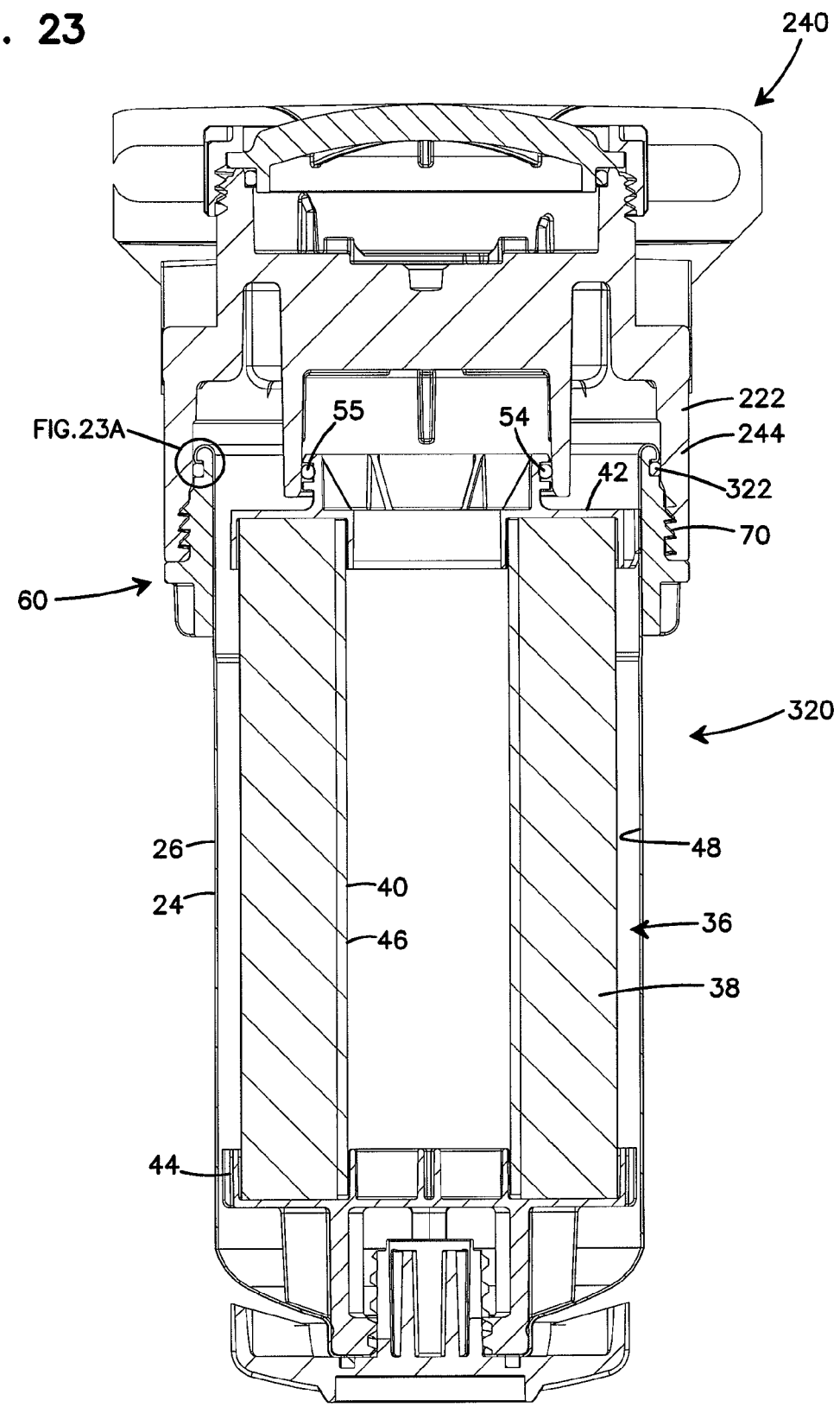
FIG. 23 is a cross-sectional view of a filter assembly utilizing the filter arrangement of FIGS. 21 and 22 secured to a filter head.

FIGS. 21-24 show another embodiment of a filter arrangement, shown generally at 320. Again, in this embodiment, the same reference numerals indicate parts with analogous features as described above with respect to FIGS. 1-20. In this embodiment, as compared to the embodiment of FIGS. 16-20, the design is analogous except that the functions of seal member 223 and seal member 74 are combined into a single seal member 322. The seal member 322 provides a seal 324 (FIG. 23A) with filter head 222; it also creates a seal 326 between the housing 24 and the sleeve 60.

The seam 321 is formed by bending or folding a continuous piece of material, such as the housing 24, over the end 224 of the sleeve 60. This sleeve 60 defines a groove 330, which holds the seal member 322. The seam 321 is bent around the end 224, down along the outside radially surface 332 of the sleeve 60, and then radially inwardly into an upper wall 334 of the groove 330. The leg 336 extending within the groove 330 and against the upper wall 334 helps to axially lock the sleeve 60 to the housing 24. The seal 326 is created between and against the seal member 322 and the leg 336 of the seam 321.

B. Methods

It should be understood that methods of making filter arrangement 20 have been discussed above and can utilize the various arrangements described herein. In general, a method includes providing housing 24 having surrounding wall 26 defining interior volume 28, an open mouth 30 providing access to the interior volume 28 and an end 32 opposite of the open mouth 30. The method includes orienting filter media construction 36 within the interior volume 28. The method further includes orienting sleeve 60 distinct from the housing 60 distinct from the housing, around the exterior wall 26 adjacent to the mouth 30 and extending partially along the surrounding wall 26. The exterior 66 of the sleeve 60 defines mounting threads 70 constructed and arranged to removably mount with the filter head 22, when the filter arrangement is secured to the filter head 22. The interior 68 of the sleeve 60 is against the exterior 62 of the surrounding wall 26. Next, the method includes securing the sleeve 60 to the housing 24, and then providing first seal member 72 against the sleeve 60 to create the seal with the filter head 22. The step of securing can include crimping tabs on the housing 24 into slots 92 in the sleeve 60. The step of securing can also include bending tabs 82 on the housing 24 into slots 92 in the sleeve 60. The step of securing can also include gluing the sleeve 60 onto the housing 24, or press fitting the sleeve 60 onto the housing 24.

C. General Principles

A filter arrangement for threadably securing to a filter head is provided. The filter arrangement may include a housing having a surrounding wall defining an interior volume, an open mouth providing access to the interior volume, and an end opposite of the open mouth; the surrounding wall having an exterior and an interior; a filter media construction operably held within the interior volume; a separate sleeve attached to the exterior of the surrounding wall adjacent to the housing mouth and extending partially along the surrounding wall; the sleeve having an exterior and an interior; the exterior of the sleeve defining mounting threads constructed and arranged to removably mount with the filter head, when the filter arrangement is secured to the filter head; the interior of the sleeve being against the exterior of the surrounding wall; and a first seal member oriented against the sleeve to create a seal with a filter head, when the filter arrangement is secured to the filter head.

The end of the housing can define an opening adapted to receive a drain valve.

The housing surrounding wall may have a plurality of tabs extending radially outwardly from the open mouth.

The sleeve can have a first rim adjacent to the open mouth; the first rim defining a plurality of slots, each slot in the plurality of slots receiving one of the tabs.

The sleeve may be secured to the housing by the tabs being formed over the slots.

The tabs can be in a crimped position relative to the slots. The tabs can be in a folded position relative to the slots.

The interior of the sleeve may a seal gland holding a second seal member forming a radial seal between and against the sleeve and the exterior of the surrounding wall.

The sleeve can be axially secured to the housing by a seam (221, 321); the seam being formed from an extension of the housing folded over a top (224) of the sleeve.

The seam (221) can forms a seal (226) with a second seal member (223) held within a groove (225) defined by the sleeve; the groove facing an outside portion of the sleeve.

The seam (221) can include a leg which locks around a projection (232) of the sleeve to lock the seam in place with the second seal member secured within the groove (225).

The sleeve can define a groove (330) holding the first seal member (322); the seam (321) is formed by an extension of the housing bent around the top (224) of the sleeve, extending along the outside radial surface (332) of the sleeve, and including a leg (336) extending into an upper wall (334) of the groove (330).

A seal (326) can be created between and against the first seal member and the leg of the seam.

Adhesive may be between the interior of the sleeve and the exterior of the surrounding wall to secure the sleeve to the housing.

The sleeve can be secured to the housing by a press-fit.

The exterior of the sleeve can defines a radial groove holding the first seal member.

The filter media construction may includes pleated media arranged in a cylindrical form to define an open filter interior; a first end cap secured to an end of the pleated media; and a filter element seal member held by the first end cap.

The first end cap can include centering structure constructed and arranged to center the filter media construction within the housing interior volume.

A filter assembly can include a filter head and a filter arrangement; the filter arrangement being removably secured to the filter head by a threaded connection between the sleeve and the filter head.

A system may include an engine utilizing a liquid; and a filter assembly a being in fluid communication with the engine to filter the liquid.

A method of making a filter arrangement can include providing a housing having a surrounding wall defining an interior volume, an open mouth providing access to the interior volume, and an end opposite of the open mouth; the surrounding wall having an exterior and an interior; orienting a filter media construction within the interior volume; and orienting a sleeve, distinct from the housing, around the exterior of the surrounding wall adjacent to the housing mouth and extending partially along the surrounding wall; the sleeve having an exterior and an interior; the exterior of the sleeve defining mounting threads constructed and arranged to removably mount with the filter head, when the filter arrangement is secured to the filter head; the interior of the sleeve being against the exterior of the surrounding wall; securing the sleeve to the housing; and providing a first seal member oriented against the sleeve to create a seal with a filter head, when the filter arrangement is secured to the filter head.

The step of securing can include crimping tabs on the housing into slots in the sleeve.

The step of securing can includes folding an extension of the housing over a top of the sleeve.

It is noted that not all the specific features described herein need to be incorporated in an arrangement for the arrangement to have some selected advantage according to the present disclosure.

The invention claimed is:

1. A filter arrangement for threadably securing to a filter head, the filter arrangement comprising a metal housing having a surrounding wall defining an interior volume, an open mouth providing access to the interior volume, and an end opposite of the open mouth; the surrounding wall having an exterior and an interior; a filter media construction operably held within the interior volume; the filter arrangement characterized by:
   (a) a separate sleeve, distinct from the housing, non-removably secured to the exterior of the surrounding wall adjacent to the housing mouth and extending partially along the surrounding wall; the sleeve having an exterior and an interior;
      (i) the exterior of the sleeve defining mounting threads constructed and arranged to removably mount with the filter head, when the filter arrangement is secured to the filter head;
      (ii) the interior of the sleeve being against the exterior of the surrounding wall;
      (iii) the sleeve being axially secured to the housing by a seam; the seam being formed from an extension of the housing folded over a top of the sleeve;
      (iv) the sleeve defining a groove facing an outside portion of the sleeve;
   (b) a first seal member held by the sleeve to create a radial seal with a filter head, when the filter arrangement is secured to the filter head; and
   (c) a second seal member held within the groove;
      (i) a seal being formed between and against the seam and the second seal member;
   wherein each of the first seal member and second seal member is located axially between the open mouth and the mounting threads.

2. A filter arrangement according to claim 1 further comprising:
   (a) adhesive between the interior of the sleeve and the exterior of the surrounding wall to secure the sleeve to the housing.

3. A filter arrangement according to claim 1 wherein:
   (a) the sleeve is secured to the housing by a press-fit.

4. A filter arrangement according to claim 1 wherein:
   (a) the exterior of the sleeve defines a radial groove holding the first seal member.

5. A filter arrangement according to claim 1 wherein:
   (a) the filter media construction includes:
      (i) pleated media arranged in a cylindrical form to define an open filter interior;
      (ii) a first end cap secured to an end of the pleated media; and
      (iii) a filter element seal member held by the first end cap.

6. A filter arrangement according to claim 5 wherein:
   (a) the first end cap includes centering structure constructed and arranged to center the filter media construction within the housing interior volume.

7. A filter assembly comprising:
   (a) a filter arrangement according to claim 1; and
   (b) a filter head; the filter arrangement being removably secured to the filter head by a threaded connection between the sleeve and the filter head.

8. A system comprising:
   (a) an engine utilizing a liquid; and
   (b) a filter assembly according to claim 7; the filter assembly being in fluid communication with the engine to filter the liquid.

9. A filter arrangement according to claim 1 wherein:
   (a) the seam includes a leg which locks around a projection of the sleeve to lock the seam in place with the second seal member secured within the groove.

10. A filter arrangement according to claim 1 wherein:
    (a) the end of the housing defines an opening adapted to receive a drain valve.

11. A method of making a filter arrangement; the method comprising:
    (a) providing a metal housing having a surrounding wall defining an interior volume, an open mouth providing access to the interior volume, and an end opposite of the open mouth;
       (i) the surrounding wall having an exterior and an interior;
    (b) orienting a filter media construction within the interior volume;
    (c) non-removably orienting a sleeve, distinct from the housing, around the exterior of the surrounding wall adjacent to the housing mouth and extending partially along the surrounding wall; the sleeve having an exterior and an interior;
       (i) the exterior of the sleeve defining mounting threads constructed and arranged to removably mount with the filter head, when the filter arrangement is secured to the filter head;
       (ii) the interior of the sleeve being against the exterior of the surrounding wall;
       (iii) the sleeve defining a groove facing an outside portion of the sleeve;
          (A) the groove holding a second seal member;
    (d) securing the sleeve to the housing by folding an extension of the housing over a top of the sleeve and forming a seal between and against the extension of the housing and the second seal member; and
    (e) providing a first seal member held by the sleeve to create a radial seal with a filter head, when the filter arrangement is secured to the filter head, the first seal member being oriented axially between the open mouth and the mounting threads.

12. A method according to claim 11 wherein:
    (a) the step of securing includes forming a seam with the extension of the housing to hold the sleeve axially relative to the housing.

13. A method according to claim 12 wherein:
    (a) the step of forming a seam includes forming a seam with a leg which locks around a projection of the sleeve to lock the seam in place with the second seal member secured within the groove.

* * * * *